(No Model.)

A. GUERRA.
TOBOGGAN SLIDE.

No. 475,081.

Patented May 17, 1892.

7 Sheets—Sheet 2.

WITNESSES:
Frank S. Busser
James H. Shields

INVENTOR:
Asterio Guerra
By his atty
G. F. Harding (No Model.) 7 Sheets—Sheet 3.

A. GUERRA.
TOBOGGAN SLIDE.

No. 475,081. Patented May 17, 1892.

WITNESSES:
Frank S. Busser
James H. Shields

INVENTOR:
Asterio Guerra
by his atty
G. H. Harding (No Model.) 7 Sheets—Sheet 4.

A. GUERRA.
TOBOGGAN SLIDE.

No. 475,081. Patented May 17, 1892.

WITNESSES: INVENTOR:

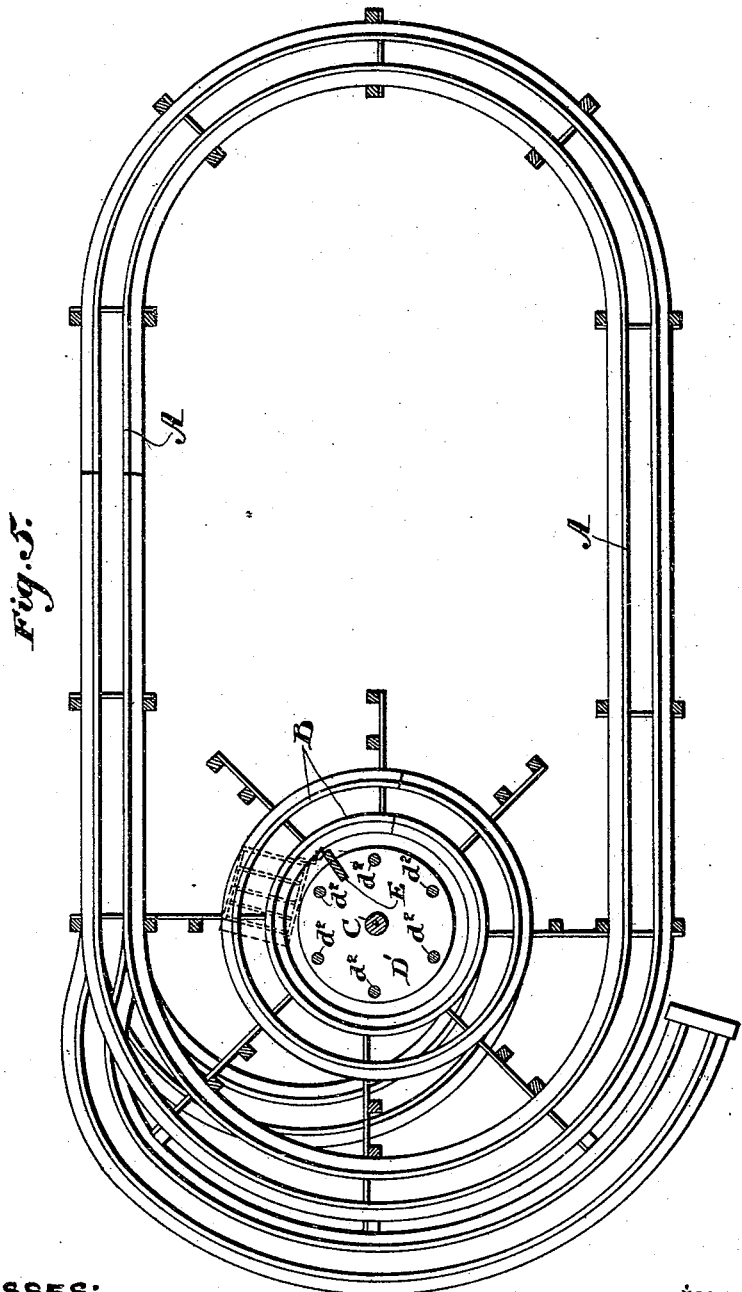

(No Model.) 7 Sheets—Sheet 6.
A. GUERRA.
TOBOGGAN SLIDE.
No. 475,081. Patented May 17, 1892.
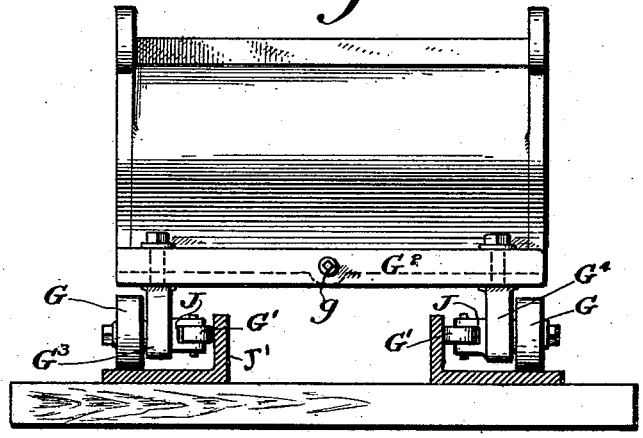
Fig. 5.
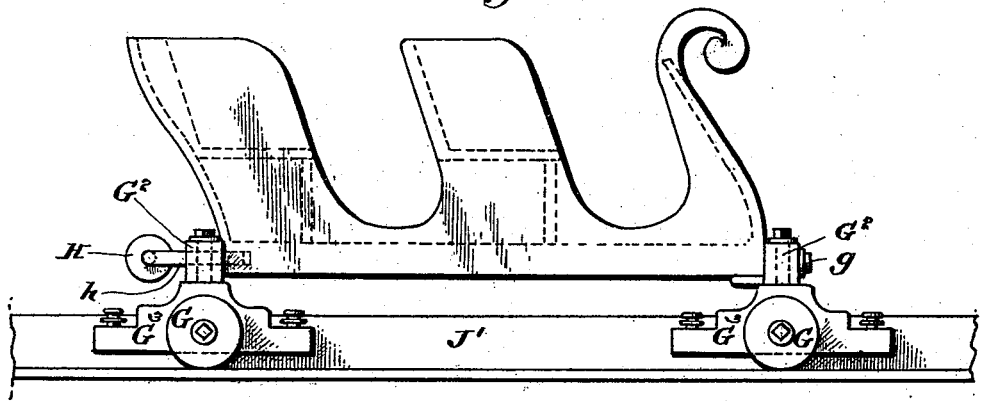
Fig. 6.
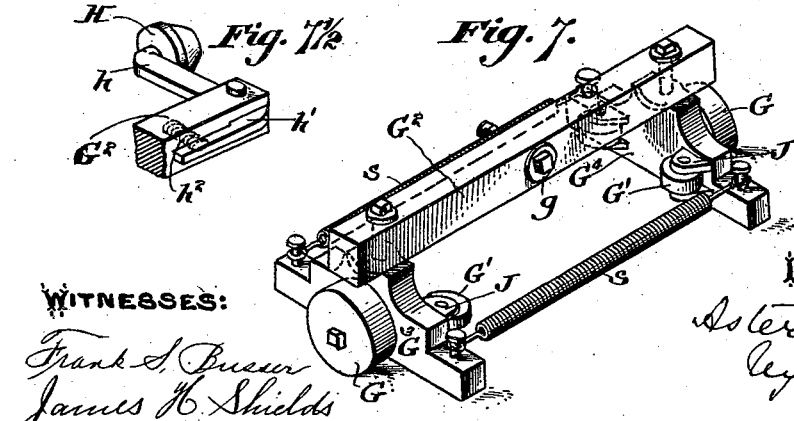
Fig. 7½.   Fig. 7.
WITNESSES:
Frank S. Busser
James H. Shields
INVENTOR:
Asterio Guerra
by his atty
G. P. Harding (No Model.) 7 Sheets—Sheet 7.

A. GUERRA.
TOBOGGAN SLIDE.

No. 475,081. Patented May 17, 1892.

WITNESSES: INVENTOR:

UNITED STATES PATENT OFFICE.

ASTERIO GUERRA, OF PHILADELPHIA, PENNSYLVANIA.

TOBOGGAN-SLIDE.

SPECIFICATION forming part of Letters Patent No. 475,081, dated May 17, 1892.

Application filed October 22, 1890. Serial No. 368,946. (No model.)

*To all whom it may concern:*

Be it known that I, ASTERIO GUERRA, a citizen of the United States, residing at Philadelphia, county of Philadelphia, and State of Pennsylvania, have invented a new and useful Improvement in Toboggan-Slides, of which the following is a full, clear, and exact description, reference being had to the accompanying drawings, which form a part of this specification.

Figure 1:
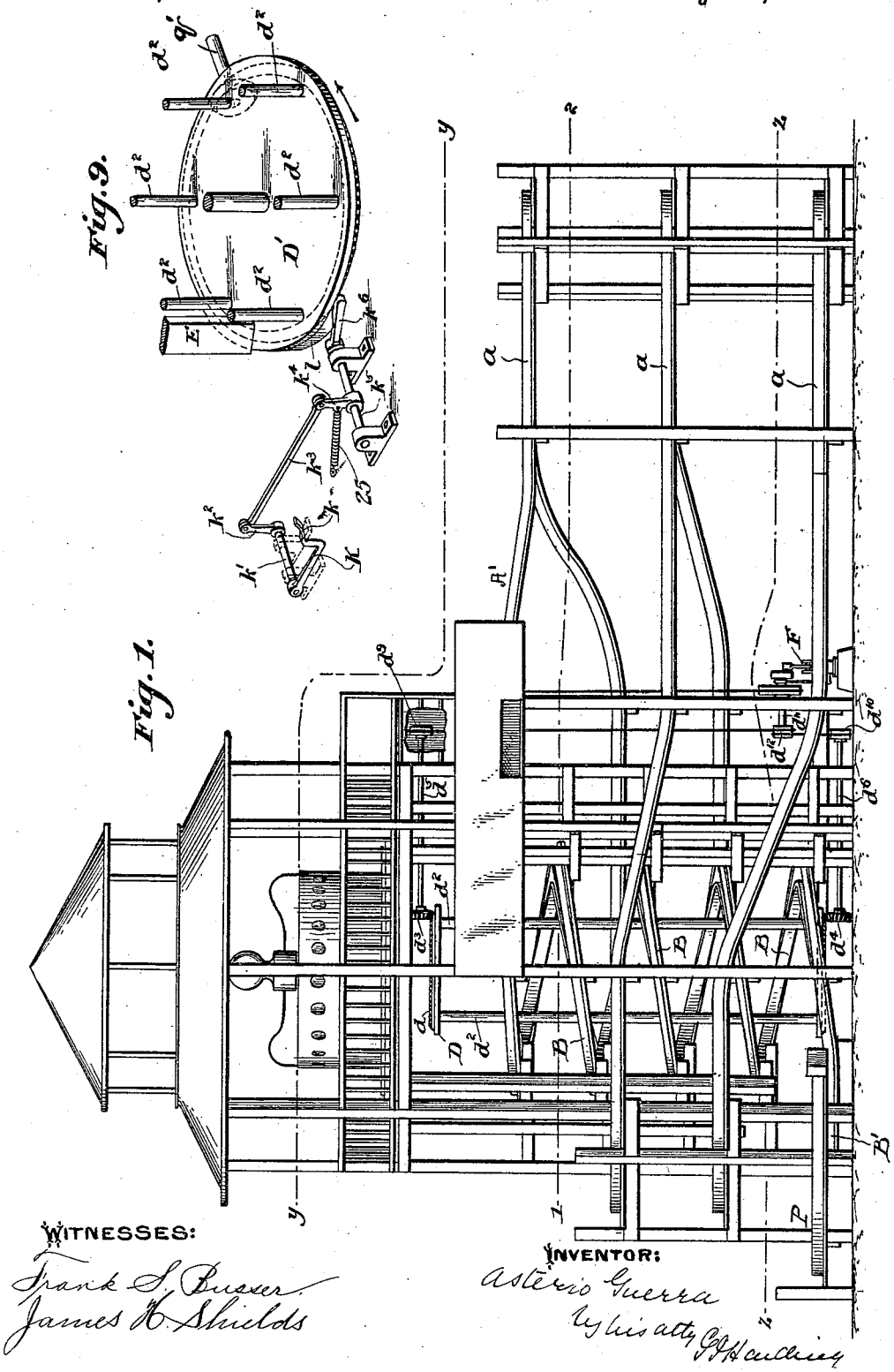
Figure 2:
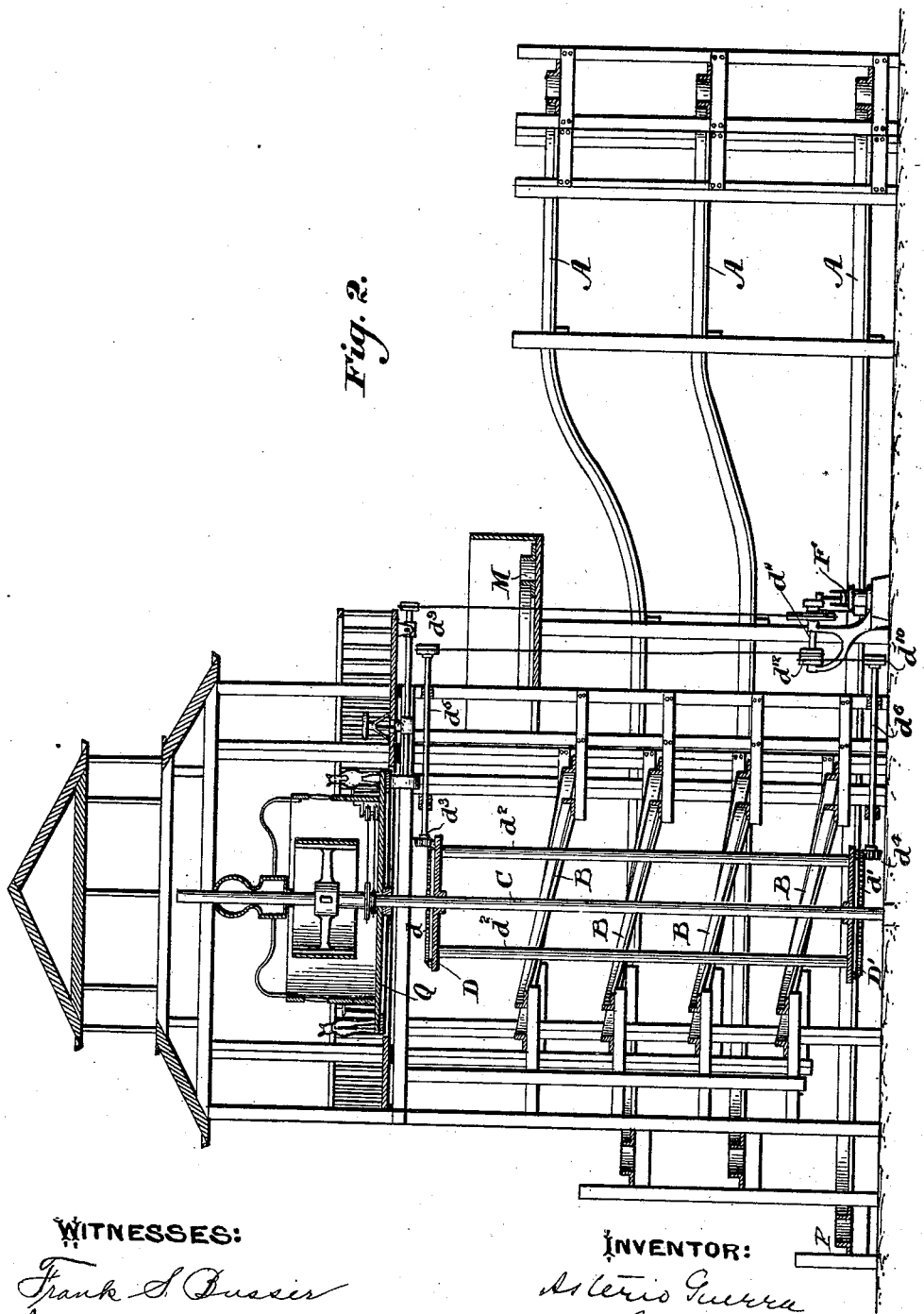
Figure 3:
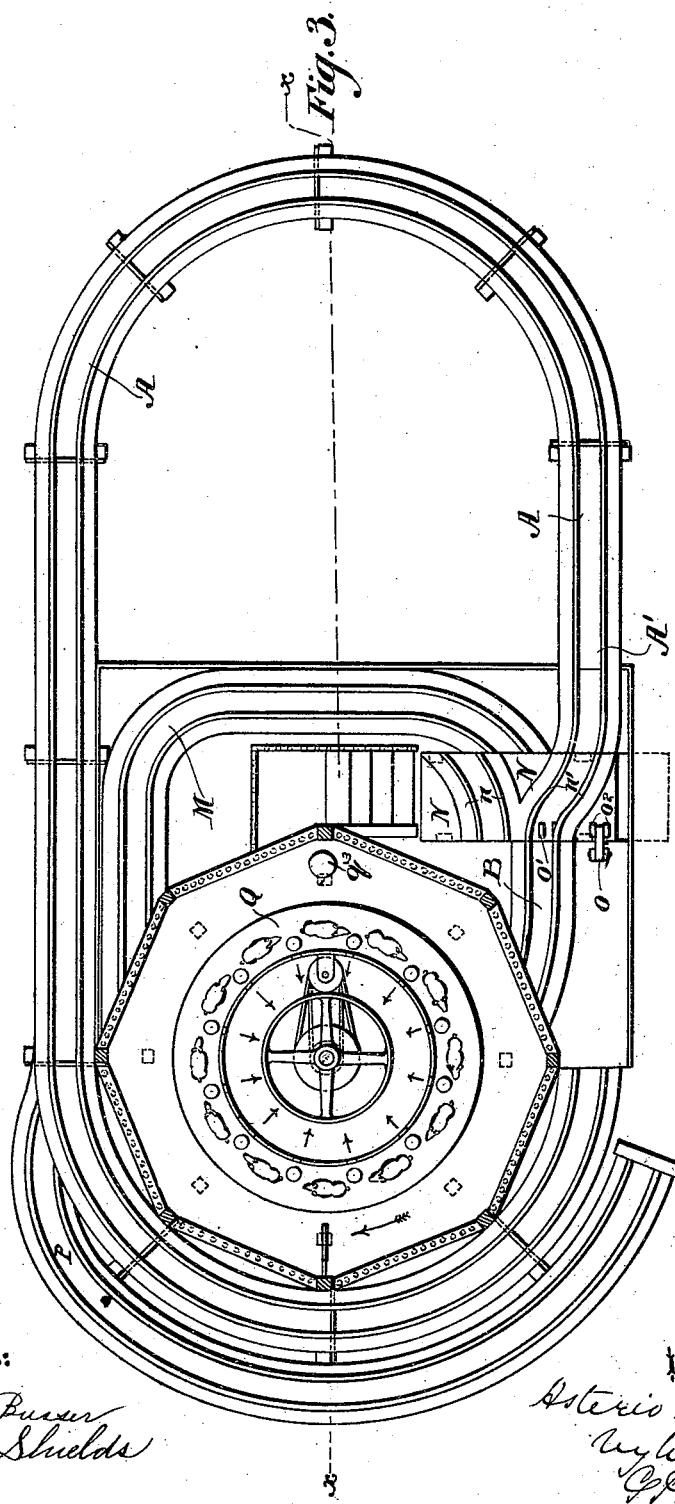
Figure 4:
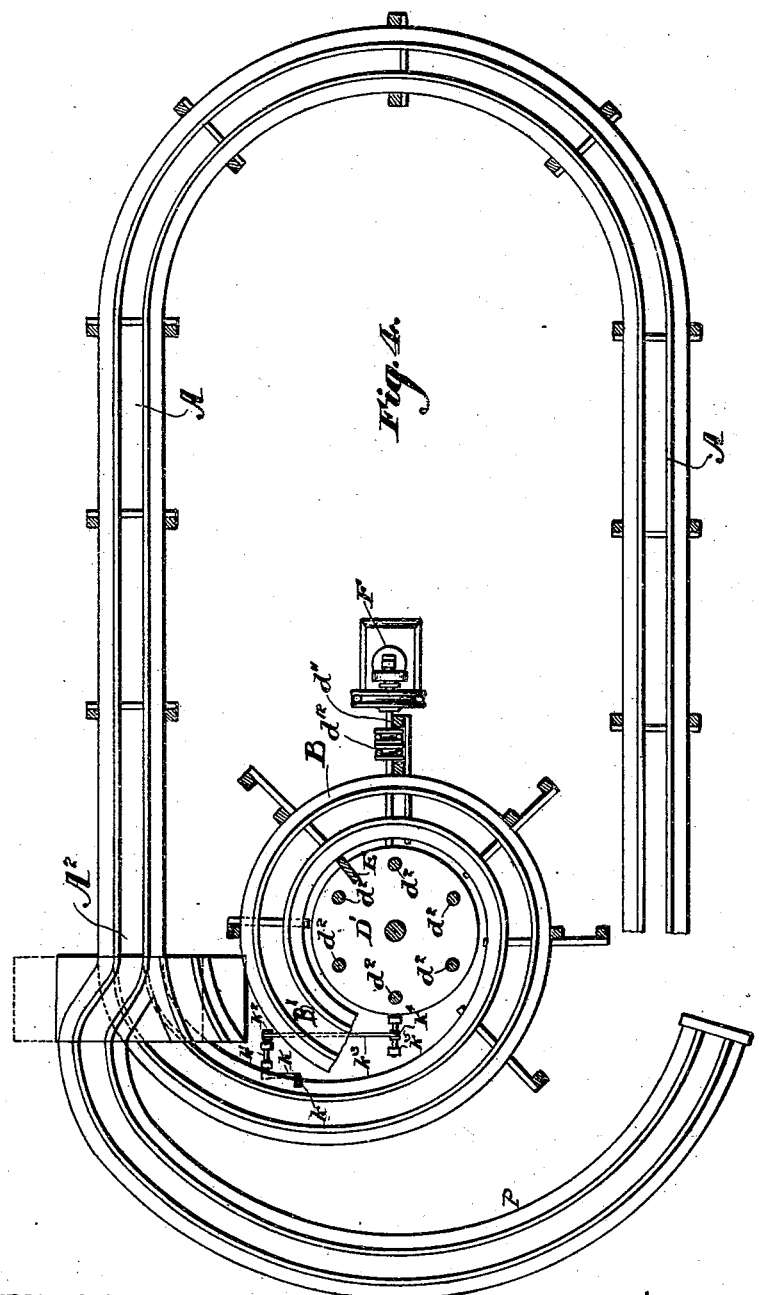
Figure 8:
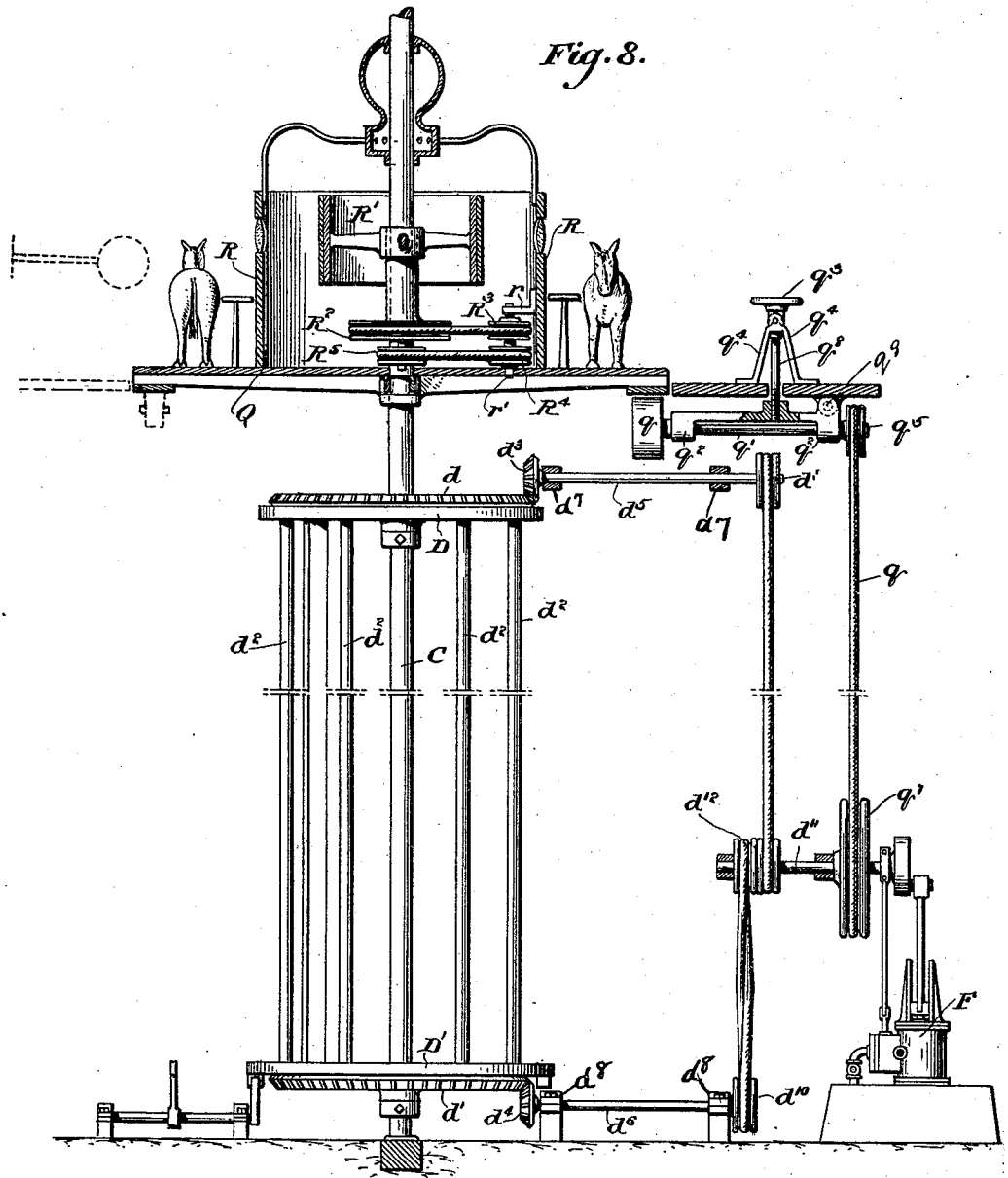

In the drawings, Figure 1 is a front elevation of my improved apparatus. Fig. 2 is a section on the line $x\ x$, Fig. 3. Fig. 3 is a sectional plan on line $y\ y$, Fig. 1. Fig. 4 is a sectional plan on line $z\ z$, Fig. 1. Fig. 5 is a sectional plan on line 1 2, Fig. 1. Fig. $5^\times$ is a front elevation of the coach with railway in section. Fig. 6 is a side elevation of coach. Fig. 7 is a detached perspective view of front truck. Fig. $7\frac{1}{2}$ is a detached perspective view of a part of the rear truck-frame carrying safety device. Fig. 8 is a skeleton view of operating mechanism. Fig. 9 is a detached perspective view showing a device to determine the time when the coaches shall be carried up the incline.

The object of this invention is to provide mechanism which will carry the car from the lowest point to the highest point and to connect the driving mechanism with a merry-go-round and a panorama; and it consists in certain safety devices for the purpose of timing the introduction of the car to the elevating mechanism and in a novel construction of car and certain other incidental mechanical devices hereinafter fully set forth.

A represents the toboggan-track, which starts at the point A' and ends at the point $A^2$. At or near the lower end of the toboggan-track A is the track B, which in the beginning slopes slightly downward and then continues in the form of a spiral or helix to a point at or near the beginning of the toboggan-track A.

C is an upright shaft.

D D' are heads sleeved upon this shaft C and adapted to revolve around said upright. These heads have secured to their upper and lower surfaces, respectively, bevel-gears $d\ d'$, and the heads are connected together by rods $d^2\ d^2$, &c., which may be made of wood or suitable metal.

E is an upright rod or bar extending from head D to head D' and extending outward beyond the heads D D'. The spiral or helical track B winds around these two heads and the frame-work formed by the rods $d^2\ d^2$, &c.

$d^3\ d^4$ are bevel-gears working in the bevel-gears $d\ d'$, respectively, said gears $d^3\ d^4$ being on the shafts $d^5$ and $d^6$, respectively supported, as shown in Fig. 8, at $d^7$ and $d^8$, respectively. On the other end of shaft $d^5$ is the pulley $d^9$, and on the other end of shaft $d^6$ is the pulley-wheel $d^{10}$.

$d^{11}$ is a shaft having the pulley-wheels $d^{12}$. From the pulley-wheel $d^{12}$ a straight belt runs to pulley $d^9$ and a crossed belt to pulley $d^{10}$. The shaft $d^{11}$ is driven by the upright engine F, and by this means the heads D D' are caused to rotate.

The toboggan-car (see Fig. $5^\times$) is constructed in the usual form, with the exception that each truck is provided with the vertical wheels G and horizontal wheels G', the horizontal wheels G' being supported in the frame or bearing J. The trucks, both front and back, consist of the beam $G^2$, to which are pivoted the frames $G^3$ and $G^4$, in which are the bearings for the wheels. A spring S connects the two frames $G^3\ G^4$. The front truck is partially connected to the body of the car by the bolt $g$, which passes through the beam $G^2$ into the body of the toboggan. The rear truck is fixedly connected with the body of the toboggan.

H is a roller having a taper end, which is connected to the arm $h$, which arm passes through the rear truck-beam $G^2$ and its end $h'$ rests in a recess in said beam. $h^2$ is a spiral spring connected to said arm $h'$ and beam $G^2$. (See Fig. $7\frac{1}{2}$.) Said roller H projects beyond the body of said toboggan. The rail used on both the spiral and the regular toboggan-slide is an angle-bar J', the vertical wheel G resting on the flat part of said bar and the horizontal wheels G' resting against the upright portion of said angle-bar.

The beginning of the helix track B slopes downward at the beginning, as shown at B', and at the beginning of said downward portion B' is placed the holding device, (represented by Figs. 4 and 9,) which consists of the arm K, having end $k$ adapted to rest against the wheel of the toboggan. Said arm is connected to the rock-shaft $k'$, which has at its other end the crank $k^2$. A connecting-rod $k^3$ connects crank $k^2$ and crank $k^4$ on rock-shaft $k^5$.

$k^6$ is an arm on the end of rock-shaft $k^5$, the other end of said arm resting underneath the head D'. The under surface of the head D' has a projecting surface $l$ at one portion. (See Fig. 9.) If the toboggan be in position upon the portion B' of track B when the arm $k^6$ strikes the projecting surface $l$, the arm K is thrown down and the toboggan by gravitation passes down the incline and the rod E strikes the roller H and the said rod forces the toboggan along and up the helix, the spring 25 returning the arm K when the toboggan passes on. It is necessary that the rod E shall strike the roller H straight, and if it should not the connection of said roller, as described, prevents the toboggan from being upset. Thus, suppose the upright should strike the bevel of said roller. It will simply force out the end $h'$ of arm $h$, making the spring active, and when the post is passed the spring returns the arm and no damage is done.

M is a side track at the upper end of the helix track B.

N is a switch-block containing the rails $n$, bent to form a connection of the track B and track M, and rails $n'$, bent to form a connection of the track B and track A.

O is a pivoted guard-bar, and $o'$ $o'$ and $o^2$ $o^2$ are lugs upon the switch-block N, between each pair of which the bar O is adapted to rest. These lugs are in such position on the board that the bar rests between lugs $o'$ $o'$ and securely holds the block in position when the rails $n$ are in action and rests between lugs $o^2$ $o^2$ and securely holds the block in position when the rails $n'$ are in action.

The same character of switch mechanism may be used at the bottom of the track A to switch the car either into the side track P or the incline portion B' of track B.

I claim—

1. In an elevating apparatus, in combination, heads, a rod or bar extending from head to head and projecting beyond said heads, a helical or spiral track winding around the space between said heads, said track being adapted to support a car, and means, substantially as described, to rotate said heads, consisting of a gear in the surface of one of said heads, a gear-wheel working in said gear on the head, a pulley on the shaft of said gear-wheel, a source of power, a shaft operated by said source of power, and a pulley-wheel on said shaft, and a belt connecting said pulley-wheel on the shaft of the gear-wheel.

2. In an elevating apparatus, in combination, heads, as D D', an upright rod, as E, extending from head to head and extending outward beyond said heads, a helical or spiral track, as B, winding around said heads and the space between said heads, a car adapted to travel on said track, gears $d$ $d'$ upon the heads D D', gears $d^3$ $d^4$, working in said gears $d$ $d'$, respectively, pulleys $d^9$ $d^{10}$ on the shafts of said gears $d^3$ $d^4$, a source of power, a shaft operated by said power, a pulley upon said shaft, a crossed belt extending from said pulley $d^{12}$ to said pulley $d^{10}$, and a straight belt extending from said pulley $d^{12}$ to said pulley $d^9$.

3. In an elevating apparatus, in combination, heads, as D D', an upright rod extending from head to head and extending outward beyond said heads, a helical or spiral track winding around said heads, the lowermost portion of said track inclining downward, a car adapted to travel on said track, a projecting portion near the under surface of the head D', an arm which rests against the under surface of said head D', a catch adapted to rest against the wheel of the car when said car is at the beginning of the track B, and connection, substantially as described, between said catch and said arm.

4. In combination, a helical elevating-track, as B, a toboggan-track, as A, a side track, a switch-block adapted to slide, said switch-block being provided with tracks adapted to connect track B and side track, and tracks adapted to connect track B and track M.

5. In combination, a helical elevating-track, as B, a toboggan-track, as A, a side track, a switch-block adapted to slide, said switch-block being provided with tracks adapted to connect track B and side track, and tracks adapted to connect track B and track A, and means, substantially as described, to secure said switch-block.

6. In combination, a helical elevating-track, as B, a toboggan-track, as A, a side track, a switch-block adapted to slide, said switch-block being provided with tracks adapted to connect track B and side track, and tracks adapted to connect track B and track A, lugs, as $o'$ $o'$ and $o^2$ $o^2$, and a rod $o$, pivoted to a fixed portion of the frame and adapted to rest between lugs $o'$ $o'$ or $o^2$ $o^2$.

7. A truck for a toboggan-car, constructed of a beam, as $G^2$, and wheel-frames pivotally connected to said beam, and a spring connecting said wheel-frames.

8. In a toboggan-car, in combination, a body forming a car, trucks constructed of beams, and wheel-frames pivotally connected to said beams, one of the beams being pivotally connected to the body of the car, whereby said beam is adapted to move vertically.

9. In a toboggan-car, in combination, a body forming a car, trucks constructed of beams, as $G^2$, and wheel-frames pivotally connected to said beam, the front beam being pivotally connected to the body of said car, so as to be adapted to move vertically, the rear truck being fixedly attached to the body of the car.

10. In combination, a toboggan-car provided with a truck-beam, as $G^2$, an arm, as $h$, which rests on the surface of said beam and projects through a roller, as H, provided with a taper end connected to said arm, and a spring connected to said arm and beam.

11. In combination, a toboggan-car provided with a truck-beam, as $G^2$, an arm, as $h$, which rests on the surface of said beam and projects through a roller and provided with a taper end connected to said arm, and a spring connected to said arm and beam-heads, a bar extending from head to head and projecting beyond said heads, and a helical or spiral track winding around the space between said heads, said track being adapted to support said car and said bar projecting sufficiently to strike said roller H.

In testimony of which invention I have hereunto set my hand.

ASTERIO GUERRA.

Witnesses:
GEO. W. REED,
FRANK S. BUSSER.